(12) United States Patent
McDonald et al.

(10) Patent No.: US 6,567,220 B2
(45) Date of Patent: May 20, 2003

(54) AVIATION CREW MASK WITH RETINAL SCAN INSTRUMENT DISPLAY FOR SMOKE IN COCKPIT EMERGENCIES

(75) Inventors: Thomas K. McDonald, Overland Park, KS (US); Gary R. Hannah, Shawnee, KS (US)

(73) Assignee: BE Intellectual Property, Inc., Welllington, FL (US)

( * ) Notice: Subject to any disclaimer, the term of this patent is extended or adjusted under 35 U.S.C. 154(b) by 0 days.

(21) Appl. No.: 09/896,749

(22) Filed: Jul. 2, 2001

(65) Prior Publication Data

US 2003/0002164 A1 Jan. 2, 2003

(51) Int. Cl.$^7$ ............................. G02B 27/14; G09G 5/00
(52) U.S. Cl. ............................................ 359/630; 345/8
(58) Field of Search ............................. 359/630, 631, 359/632, 634, 636, 637, 638, 639, 815; 345/7, 8, 9

(56) References Cited

U.S. PATENT DOCUMENTS

| | | | |
|---|---|---|---|
| 3,170,979 A | 2/1965 | Baldwin et al. | 359/632 |
| 4,741,332 A | 5/1988 | Beaussant | 128/201.3 |
| 4,915,106 A | 4/1990 | Aulgur et al. | 128/201.28 |
| 5,091,719 A | 2/1992 | Beamon, III | 345/8 |
| 5,420,828 A | 5/1995 | Geiger | 367/131 |
| 5,601,078 A | 2/1997 | Schaller et al. | 128/205.23 |
| 5,664,566 A | 9/1997 | McDonald et al. | 128/205.25 |
| 5,954,052 A | 9/1999 | McDonald et al. | 128/206.27 |
| 6,078,427 A | 6/2000 | Fontaine et al. | 345/8 |
| 6,097,353 A | 8/2000 | Melville et al. | 345/8 |
| 6,120,461 A * | 9/2000 | Smyth | 600/558 |
| 6,137,457 A | 10/2000 | Tokuhashi et al. | 345/8 |
| 6,157,291 A | 12/2000 | Kuenster et al. | 345/8 |
| 6,297,749 B1 * | 10/2001 | Smith | 340/980 |
| 6,377,401 B1 * | 4/2002 | Bartlett | 359/630 |

FOREIGN PATENT DOCUMENTS

| | | |
|---|---|---|
| EP | 252281 | 1/1988 |
| EP | 0301997 | 2/1989 |
| JP | 8317318 | 11/1996 |
| WO | 9002582 | 3/1990 |

* cited by examiner

*Primary Examiner*—Ricky Mack
(74) *Attorney, Agent, or Firm*—Hovey Williams. LLP

(57) ABSTRACT

An aircraft crew vision mask (10) is provided which is especially designed to be used during emergency flight conditions where smoke is present in the cockpit. Preferably, the mask (10) includes a transparent lens (14) supported by a peripheral face seal (16), and has a breathable gas mask (18). In order to provide important aircraft flight information to the wearer (12), the mask (10) is equipped with a display device such as a retinal scanning display device (26) having an output (28). The device (26) is operably coupled to an aircraft information input (46) which supplies digital information such as airspeed, attitude, altitude, heading, vertical speed, navigation information, video inputs or flight manual information to the device (26). A smoke condition sensor (48) and manual input control (50) serve to initiate operation of the device (26) with selective on/off and channel select control capability.

10 Claims, 1 Drawing Sheet

AVIATION CREW MASK WITH RETINAL SCAN INSTRUMENT DISPLAY FOR SMOKE IN COCKPIT EMERGENCIES

BACKGROUND OF THE INVENTION

1. Field of the Invention

The present invention is broadly concerned with improved aircraft crew vision masks which can be rapidly donned during a smoke in cockpit emergency and which include a head-mounted display device such as a retinal scanning display device operably mounted on the mask and coupled with a source aircraft flight information (e.g., flight instrumentation) in order that flight information is directly scanned onto the retina of a wearer's eye, thereby allowing the wearer to view the flight information notwithstanding the presence of cockpit smoke. More particularly, the invention is concerned with such masks which in preferred forms include automatic sensor-responsive and manual control capabilities for the retinal scanning device, so that the wearer may selectively turn the display on or off, or change the information input thereto.

2. Description of the Prior Art

Among the dangerous and even catastrophic emergencies encountered during aircraft flight is the existence of smoke in the cockpit. This stems from the fact that while the pilot may have an adequate source of breathable gas and his eyes may be protected from irritants, nonetheless he may be unable to see the instrument panel and have adequate vision through the aircraft windshield owing to accumulated smoke. Indeed, in the recent past two commercial airliners have been lost after the aircrew reported smoke within the cockpit, this occurring even though the crew successively donned oxygen masks.

One response to this problem is described in U.S. Pat. No. 5,202,796 and is referred to as the EVAS (Emergency Vision Assurance) system. In this device, a clear plastic airbag is provided adjacent the instrument panel. In the event of a smoke emergency, the pilot pulls a tab, which inflates the airbag. The pilot can then press his face against the inflated transparent bag in order to see the instrument panel. The size of the bag also inherently limits the field of view of the user. However, this relatively unsophisticated device presents a number of problems. First, the pilot must keep his face firmly against the inflated bag, which means that he cannot attend to other emergency conditions which may require attention. Furthermore, the device takes 15–20 seconds to deploy, which represents a rather significant time lag before any instrument vision is restored.

Conventional heads up displays (HUDs) have been used in civilian and military aircraft for a number of years, to display instrumentation and targeting information for example. These types of devices are not generally useful in a smoky cockpit situation, because dense smoke in the cockpit will prevent the pilot from actually seeing the display, or may disrupt system projection.

Head-mounted displays have been proposed in the past for use in various contexts. For example, retinal scanning displays (also known as VRD displays) have been suggested as vision enhancers in fire fighting equipment and the like. Retinal scanning displays differ from heads up displays and similar technologies in that an image is raster scanned directly onto the retina of user, as opposed to being projected onto another surface. See, e.g., U.S. Pat. No. 6,097,353.

U.S. Pat. No. 5,420,828 describes a viewing screen assembly for mounting on helmets or face masks, particularly in the context of fire fighter's helmets. The device described in this patent is designed to accept video input from a remote person or location. U.S. Pat. No. 6,078,427 describes head-mounted displays for use with flight simulators, which may include a virtual retinal display device. U.S. Pat. No. 5,091,719 describes a helmet display for use on aircraft pilot helmets. This reference does not disclose the use of retinal scanning displays, nor is the problem of smoke addressed. See also U.S. Pat. Nos. 3,170,979, 6,157,291 and 6,137,457.

SUMMARY OF THE INVENTION

The present invention overcomes the problems outlined above and provides an improved aircraft crew vision mask equipped with a visual display device such as a retinal scanning display device and operably coupled with one or more sources of aircraft flight information in order to display such information as a part of a retinal scan during a smoke in the cockpit emergency. Generally speaking, the vision mask comprises a substantially transparent lens with a face seal disposed about and supporting the lens, and with a harness assembly for mounting the mask on the face of a wearer so that the wearer may look through the lens. The retinal scanning display device is operably mounted on the mask and is oriented to generate a retinal scan on a retina of the wearer.

Preferably, the mask is of the full-face variety and includes apparatus for delivery of breathable gas to the wearer. It is contemplated that the mask of the invention would be normally stowed in a location adjacent the wearer until an emergency develops; at this point, the mask may be grasped and pulled from stowage in the manner identical to present-day emergency oxygen masks. To this end, it is preferred that the mask be equipped with an inflatable harness which expands to a relatively large size upon removal of the mask from stowage, in order to facilitate donning of the mask.

The visual display device is preferably secured to the mask exterior at the face seal of the mask and includes an output substantially at the wearer's eye level. In one form, the RSD depends from the face seal of the mask, and has an output at eye level.

In order to activate the display, the preferred vision mask has a sensor which detects a parameter indicative of visible smoke or conditions which precede the generation of visible smoke, such as an ion detector. The sensor is coupled with the flight information source(s) and the display for this purpose. Also, a manual controller is also provided, which gives on/off capability and also the option of switching between different information inputs. For example, the usable information may be selected from the group consisting of aircraft airspeed, attitude, altitude, heading, vertical speed, navigation information, video from camera(s) external to or within the aircraft, flight manual information, and combinations thereof, and the wearer may wish to switch between various ones of these inputs.

DETAILED DESCRIPTION OF THE PREFERRED EMBODIMENT

Figure 1:
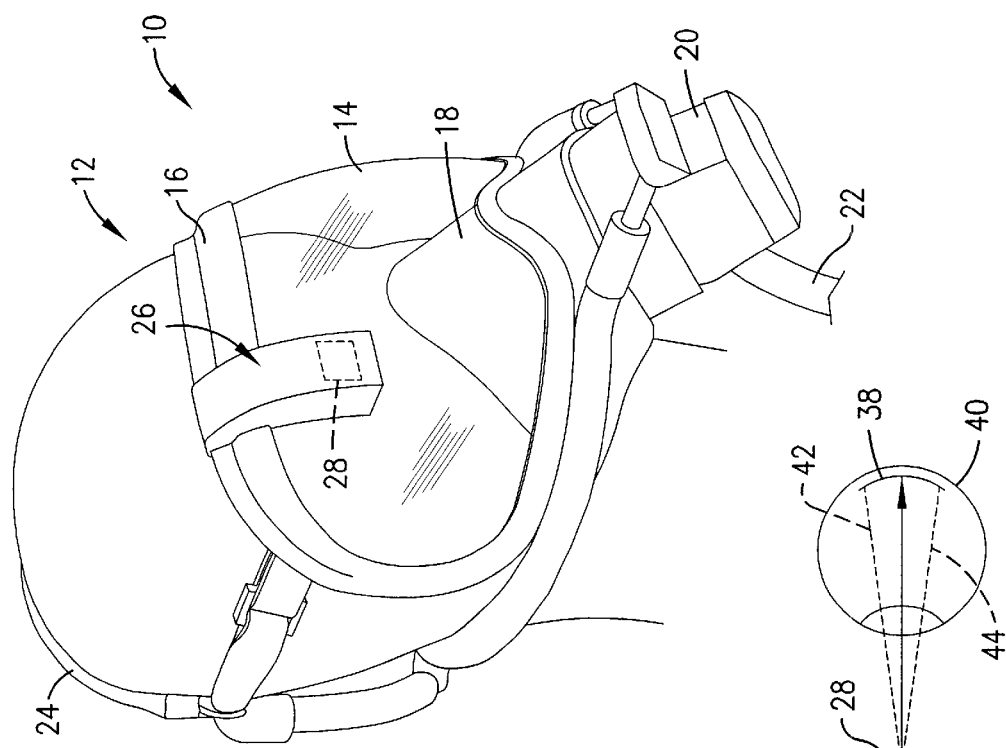
FIG. 1 is a perspective view of a full-face aircraft crew mask in accordance with the invention, including an external retinal scan display device secured to the mask.

Turning now to the drawing, an aircraft crew vision mask 10 is illustrated in FIG. 1, mounted on the head of a wearer.

Broadly speaking, the mask 10 includes a transparent, preferably flexible lens 14 with a peripheral, synthetic resin or elastomeric face seal 16. In this embodiment, the mask 10 is a "full-face" mask and is equipped with apparatus for delivering breathable gas to the wearer, including a gas mask 18 designed to cover the nose and mouth region of the wearer, a regulator 20 and breathable gas input line 22. The overall mask 10 further includes an inflatable harness 24 which allows the wearer to rapidly don the mask during emergency situations. Finally, the mask 10 is also equipped with a retinal scanning display device 26 which is supported on seal 18 and depends therefrom to present, substantially at the wearer's eye level, an output 28.

Figure 2:
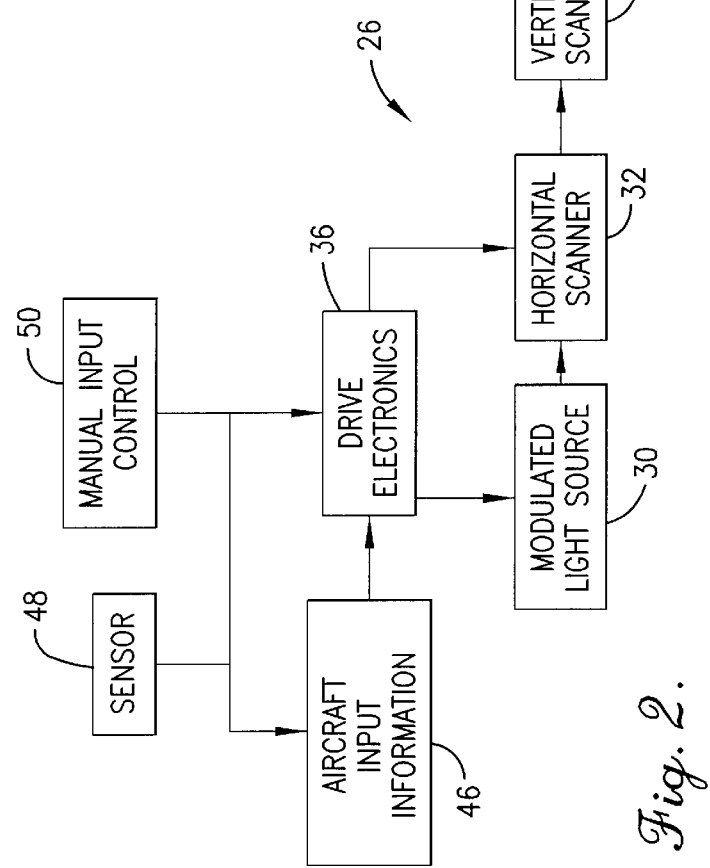
FIG. 2 is a block diagram illustrating the components of a preferred retinal scan display device, as well as control elements therefor.

Referring to FIG. 2, the display device 26 includes a modulated light source 30 which may be monochrome or have multiple light sources for color display. The light source 30 is coupled with horizontal and vertical scanners 32, 34 leading to output 28. The device 26 is also provided with drive electronics 36 (typically including a microprocessor) which control the operation of the light source 30 and scanners 32, 34. It will be appreciated that retinal scanning devices of the type used in the invention are known and commercially available from Microvision, Inc. of Sheridan, Wyo. In general, these scanning devices are designed to generate a raster scan image directly upon the retina 38 of the wearer's eye 40, as schematically illustrated by marginal light beams 42, 44. Typical retinal display devices are illustrated and explained in U.S. Pat. No. 6,097,353, incorporated by reference herein.

The input to retinal scanning display 26 may be any aircraft flight information, and is denoted 46 in FIG. 2. That is, the information to be displayed via device 26 in the present invention may be any desired information relating to the flight or aircraft, such as airspeed, attitude, altitude, heading, vertical speed, navigation information, video from camera(s) external to or within the aircraft, flight manual information, and combinations thereof. Typically, the input information would be derived at least in part from the normal aircraft instrumentation as seen by the pilot during normal flight conditions. For example, one specific input may be from a Garmin Color IRF GFS NAV/COM with glideslope and moving map; this device is available from Garmin International, Inc. of Olathe, Kans.

The operation of display device 26 may be initiated automatically through sensor 48 or manually through input control 50; as shown, these components are operatively connected with the drive electronics 36 and the information input 46. The sensor 48 is designed to detect a parameter indicative of visible smoke or conditions preceding the generation of visible smoke, such as an ion detector. When the sensor 48 detects such a parameter at a predetermined magnitude, signal is generated which controls the drive electronics 36 and input information 46 to thereby begin generation of the desired retinal display.

The manual input control 50 allows the wearer to begin operation of the retinal display 26 even if no smoke-related conditions exist. Also, in preferred forms, the manual control includes an on/off control switch permitting the wearer to turn off the display 28, and/or may include a channel select switch allowing the wearer to switch between different sources of input information (e.g., the wearer may elect to switch between altitude and airspeed information to flight manual information), or selected information may be projected on one page.

An especially preferred mask 10 in accordance with the invention is described in U.S. Pat. No. 5,664,566 incorporated by reference herein. This type of quick-donning full-face mask with inflatable harness allows the wearer to rapidly pull the mask from a stowage location while the harness inflates to an enlarged size, whereupon the mask can be pulled over the wearer's head and face followed by deflation of the harness to hold the mask firmly in place. It will be understood, however, that the invention is not limited to any particular type of mask and may be a simple visor mask without supplemental gas equipment.

During normal flight conditions, the mask 10 would be stowed adjacent the crew member. In the event of an emergency the crew member grasps the mask and pulls it from its stowed position. This automatically initiates inflation of the harness for quick donning as described. If the emergency includes smoke in the cockpit or conditions preceding the generation of visible smoke exist, the sensor 48 comes into play to begin operation of display device 26. The default display would be preselected and would normally comprise the most important flight instrumentation readings such as airspeed, attitude and altitude. However, the wearer may change the display through appropriate manipulation of manual control 50, which as explained also allows on/off selection and also channel selection for different desired display information.

A significant advantage obtained through use of the scanning device 26 stems from the fact that the pilot need not restrict his movements to continue viewing the display, i.e., the display mounted on the vision mask "moves with" the pilot, as compared with HUDs which have a limited viewing perspective. Also, retinal scanning displays offer further benefits, in that visibility does not vary with external light levels, so that display quality and image clarity remain unaffected even in heavy smoke. While the described embodiment is a purpose-built vision mask, it will be understood that otherwise conventional masks could readily be retrofitted with display devices in accordance with the invention.

We claim:

1. In an aircraft crew vision mask comprising a substantially transparent lens, a face seal disposed about and supporting said lens, and a harness assembly for mounting the mask on the face of a wearer so that the wearer may look through the lens, the improvement which comprises a retinal scanning display device operably mounted on said mask and oriented to generate a viewable retinal scan display in the form of a raster scan image directly upon a retina of said wearer, said display device operably coupled with an aircraft flight information source in order to retinal scan display flight information directly onto said retina.

2. The vision mask of claim 1, said mask being a full-face mask and including apparatus for delivery of breathable gas to said wearer.

3. The vision mask of claim 1, said display device being secured to said face seal above the eye of said wearer, said display device including an output at the wearer's eye level.

4. The vision mask of claim 1, said display device being mounted adjacent the exterior surface of said lens.

5. The vision mask of claim 1, including a sensor for detecting a parameter indicative of visible smoke or conditions preceding the generation of visible smoke, said sensor operably coupled with aircraft flight information source and said display, in order to initiate operation of said display in response to detection of said parameter by said sensor.

6. The vision mask of claim 5, said detector comprising an ion detector.

7. The vision mask of claim 5, said display including a modulated light source and horizontal and vertical scanning means for generating said retinal display.

8. The vision mask of claim 1, said information selected from the group consisting of aircraft airspeed, attitude, altitude, heading, vertical speed, navigation information, video from camera(s) external to or within the aircraft, flight manual information, and combinations thereof.

9. The vision mask of claim 1, including a manual input control operably coupled with said aircraft information source and said display device in order to allow the wearer to select specific input information for display by said display device.

10. The vision mask of claim 9, said manual input control including an on/off control and a channel select control permitting the wearer to select the type of information to be displayed by the device.

\* \* \* \* \*